Nov. 1, 1955 M. G. ALJETS 2,722,168
LIFT FOR GRAIN DRILL MARKERS
Filed March 23, 1951 7 Sheets-Sheet 1

INVENTOR
Martin G. Aljets
BY Munson H. Lane
ATTORNEY

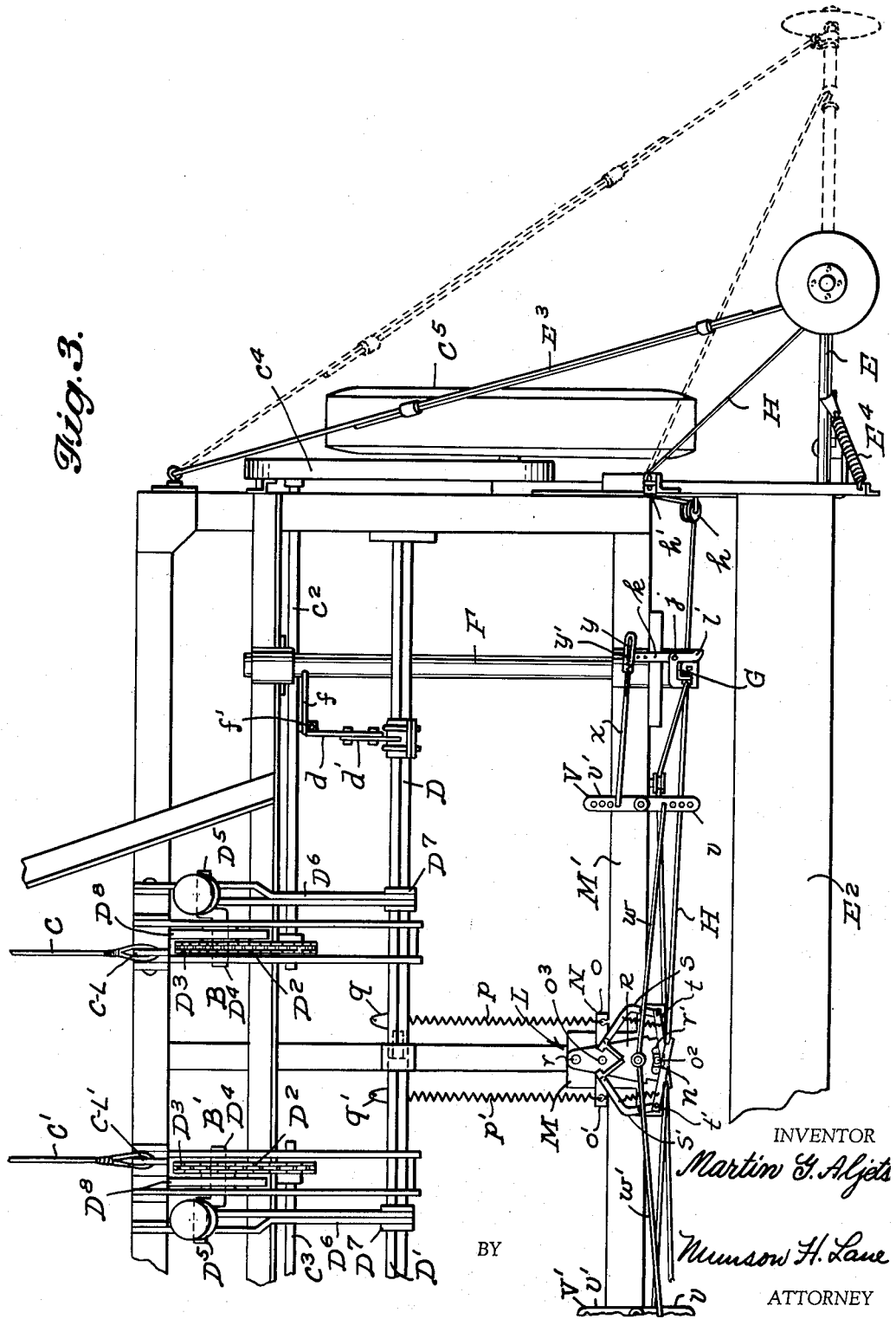

Nov. 1, 1955 M. G. ALJETS 2,722,168
LIFT FOR GRAIN DRILL MARKERS
Filed March 23, 1951 7 Sheets-Sheet 4
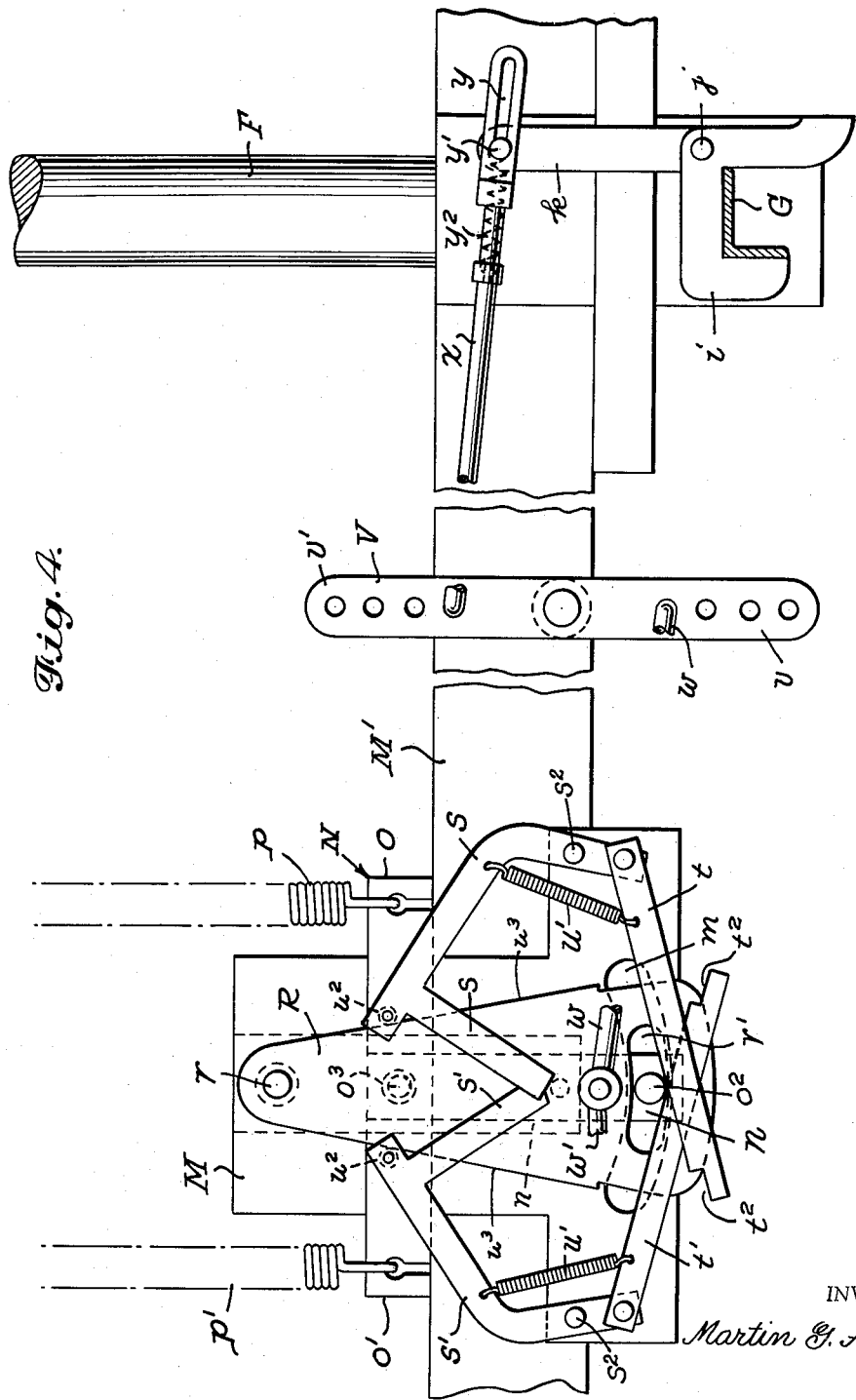
INVENTOR
Martin G. Aljets
BY Munson H. Lane.
ATTORNEY

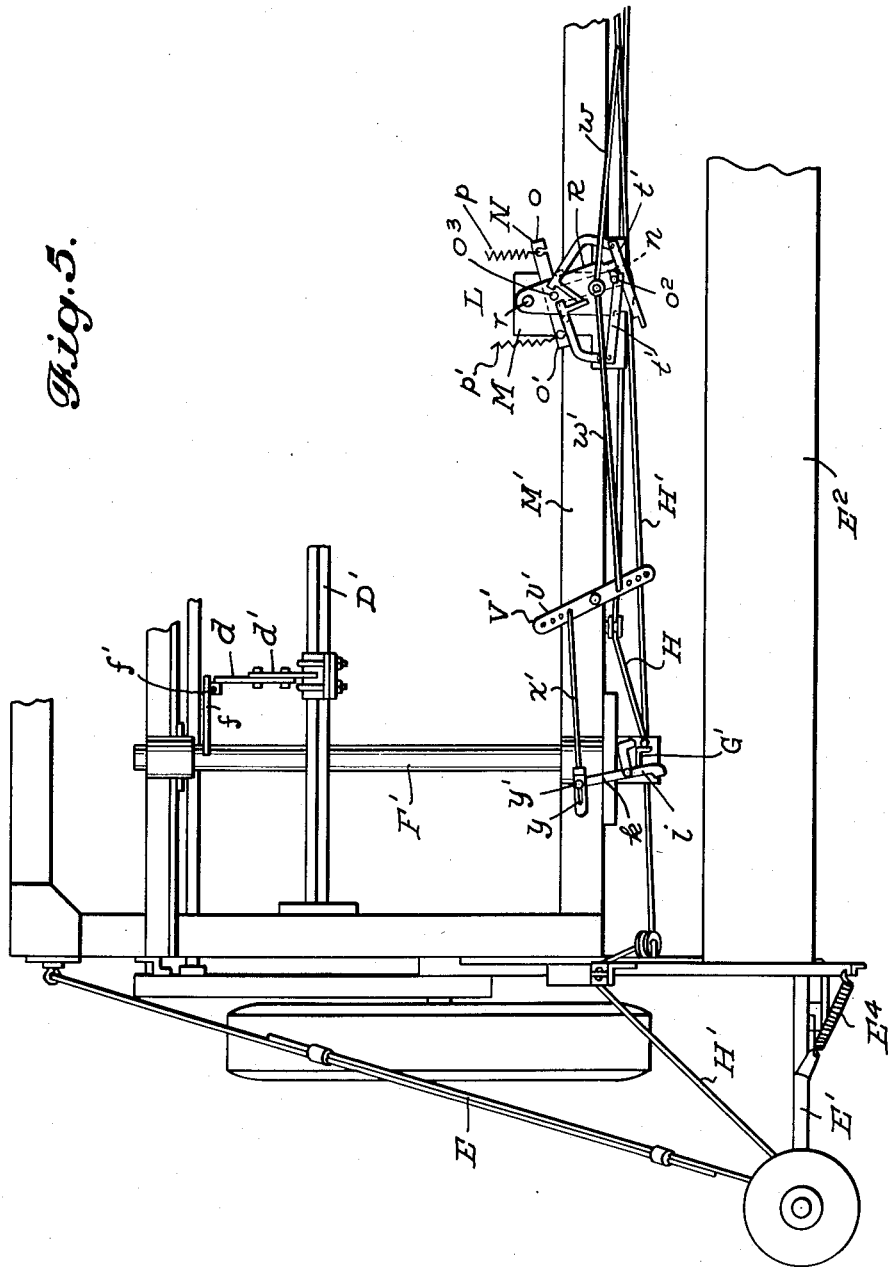

Nov. 1, 1955 M. G. ALJETS 2,722,168
LIFT FOR GRAIN DRILL MARKERS
Filed March 23, 1951 7 Sheets-Sheet 6
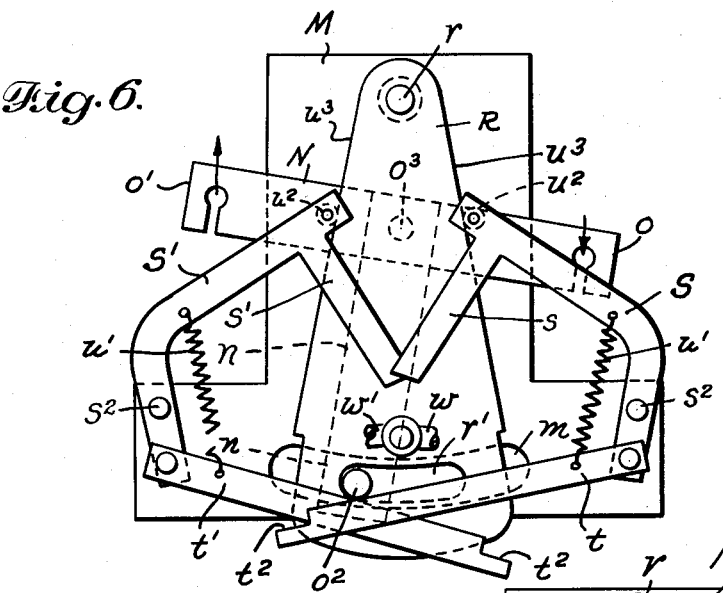
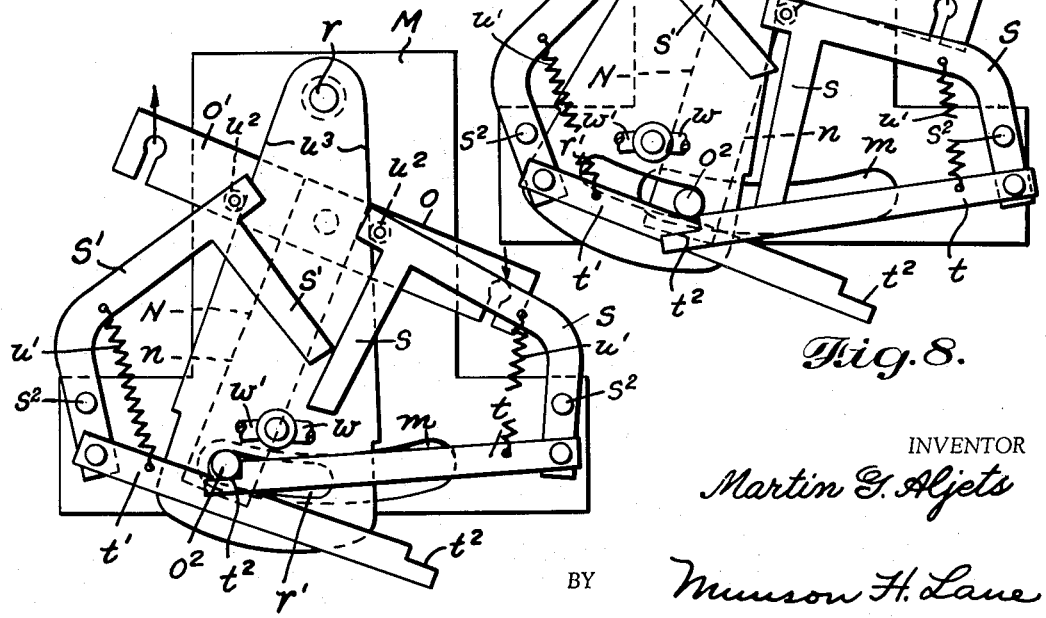
INVENTOR
Martin G. Aljets
BY Munson H. Lane
ATTORNEY

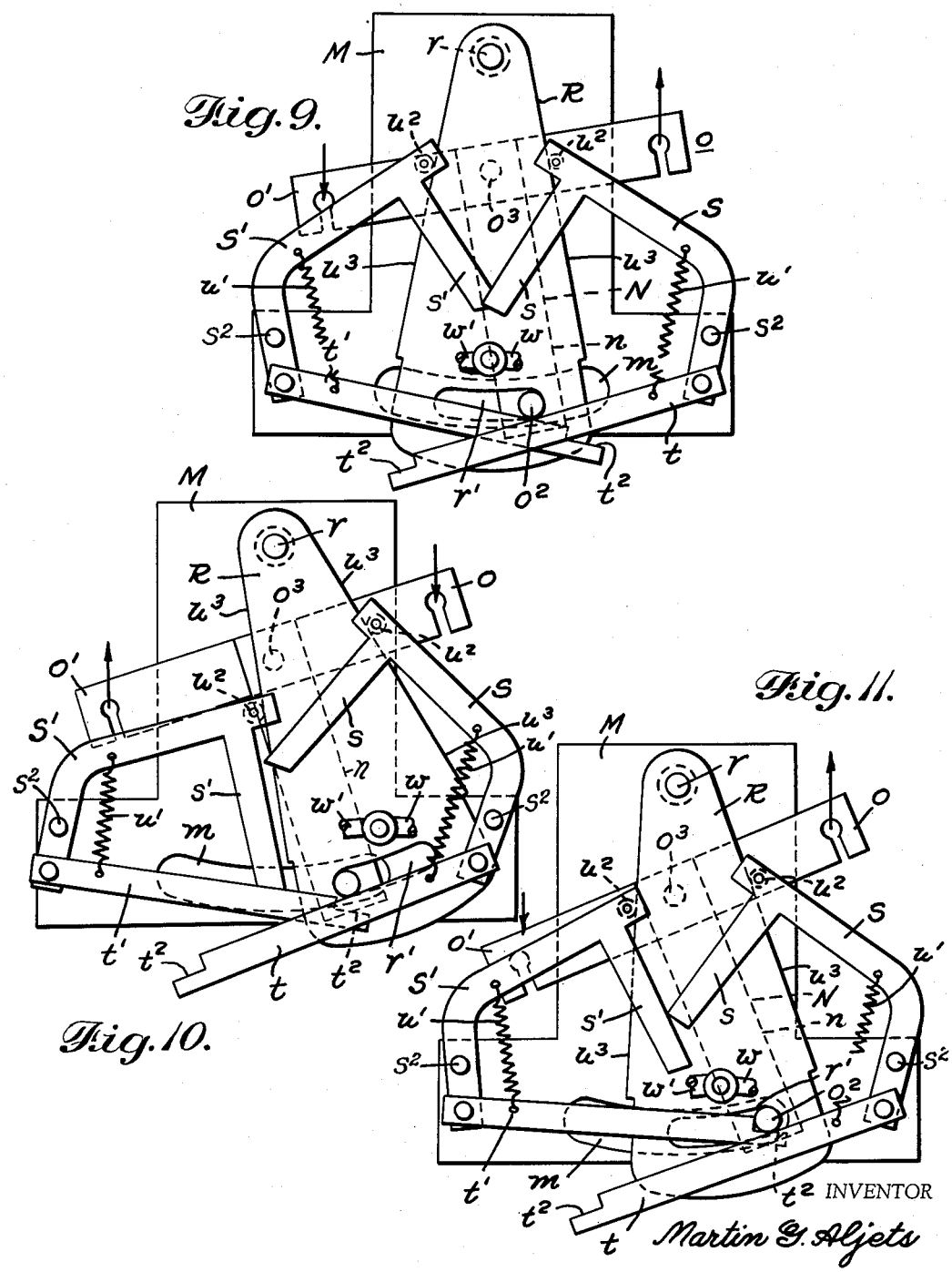

United States Patent Office 2,722,168
Patented Nov. 1, 1955

2,722,168

LIFT FOR GRAIN DRILL MARKERS

Martin G. Aljets, Dorsey, Ill.

Application March 23, 1951, Serial No. 217,249

10 Claims. (Cl. 97—230)

This invention relates to improvements in markers for tractor-drawn grain drills and other similar agricultural machines, and particularly to grain drills or other machines of that type having right and left hand markers and unitary sets of drills or other planting, seeding or other ground working tools or units arranged on opposite sides of its longitudinal center and adapted to be independently raised and lowered by trip mechanism and power take-off means operated by the running gear or drive mechanism of the machine or a tractor connected therewith. More particularly, the invention relates to means for simplifying the construction and operation of the markers and their controlling means and reducing the amount of manual labor required to control their movements into and out of operative position so as to allow the driver or operator to have free use of his hands in guiding and otherwise operating the tractor, and particularly in making turns.

In implements of the character mentioned to which my invention relates it has heretofore been the practice to employ a pair of control ropes for actuating the right and left hand markers and a separate pair of control ropes for the power lift means employed to raise the seeding or planting units, when such power lift means is employed, thus requiring the use of a total of four ropes to be operated at times in lowering and raising the planting units and markers in a power-lift equipped machine having right and left hand planting units. The use of such a number of ropes not only adds complexity to the parts of the machine, but makes it difficult for the operator to handle both the ropes and the tractor, especially in turning the tractor at each end of the field.

For example, assuming that in sowing a field it is desired to start at the right of the field and sow to the left of the starting point, it will be understood that in accordance with customary practice the left hand marker is dropped and sowing continues to the opposite end of the field, where the left hand marker is raised and both markers are held in raised position until the turn is completed, after which the right hand marker is dropped. Sowing then continues to the starting end of the field on the mark which the left hand marker made on the previous trip. Upon arriving at the starting end it was necessary, in accordance with previous practice, to raise the right hand marker and hold both markers up until the turn was completed, then to lower or drop the left hand marker, the operation being repeated at each end of the field until sowing was completed.

The purpose of my invention is to eliminate the use of two separate ropes for controlling and actuating the markers and to use only the two ropes normally employed for controlling the seeding, planting or other ground working units. This, in accordance with my invention, is accomplished by the use of a mechanical controller which may be readily applied to existing equipment and which serves to raise and lower the correct marker at the correct time as the usual power lift control ropes are actuated for raising and lowering the planting units, thus leaving the hands of the operator free to operate the tractor while turning.

The main object of my invention is to provide means for overcoming this objection and reducing the number of control ropes to no more than two, through the operation of which the power-lift devices and markers may be properly controlled to correctly lower and raise the markers as required.

A further object of the invention is to provide means operative when the implement is in motion and a control rope is operated to automatically release one marker for action and raise the other marker and to perform these operations correctly on making turns at each end of a field, leaving the hands of the operator free, as soon as the rope is pulled, to guide and control the operation of the tractor.

In the accompanying drawings showing an exemplificative type of means for carrying my invention into practical effect:

Fig. 3 is a top plan view of the parts at the right hand side of the machine;

Fig. 4 is a plan view on an enlarged scale of the control device and the marker holding and releasing means arranged at the right hand side of the machine, showing the parts of the marker raising and lowering means in neutral position;

Fig. 5 is a similar view on a smaller scale than Fig. 4 and including additional mechanism, of the control device and the marker holding and releasing means arranged at the left hand side of the machine, showing the controller and latch device at said side operated to release the left hand lifting arm and lower the right hand marker; and Figs. 6 to 11, inclusive, are views of the controller showing the different positions of its parts in its controlling actions.

Figure 1:
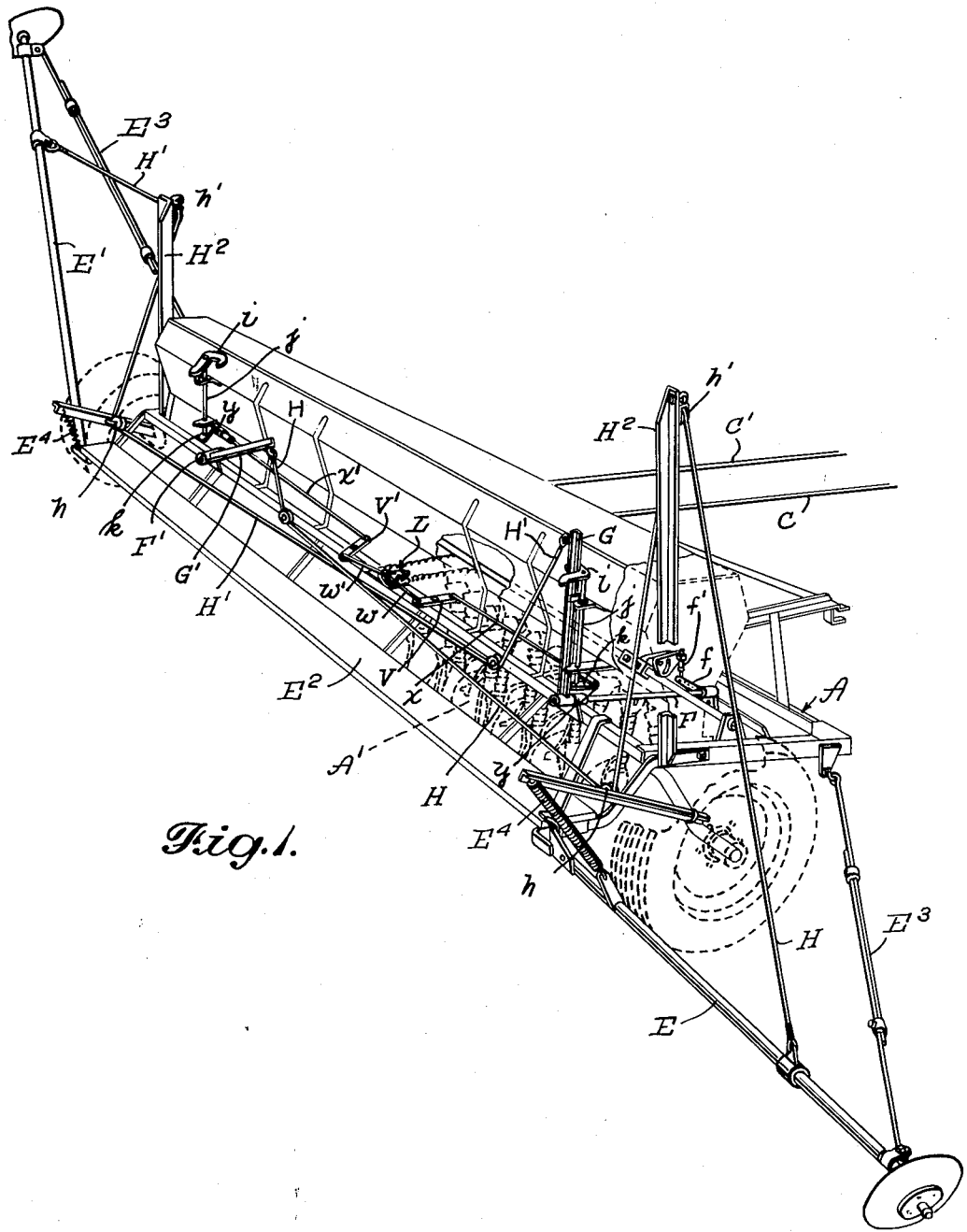
Fig. 1 is a rear perspective view of so much of a grain drill as is necessary to illustrate my invention, showing the left hand marker in raised position and the right hand marker in lowered position.

Referring now more particularly to the drawings, A represents the frame of a grain drill or other tractor-drawn seed sowing or ground working machine in which sets of grain drills or other ground working or planting devices or units A', one set only of which is shown in Fig. 1, are arranged at each side of the longitudinal center of the machine, the sets in practice being arranged so as to be unitarily raised and lowered independently of the other set by means of power-lift devices B, B' (see Fig. 3), one of which is arranged at each side of the machine for raising and lowering the set of ground-working devices or sowing units at that side. These power-lift devices may be of any suitable or conventional construction, or may be of the general type hereinafter described. Two ropes or cables C, C' are provided for controlling the right and left hand power-lift devices, one extending from each power-lift device to the tractor in proximity to the driver's seat where they may be conveniently operated. The power-lift devices control the operation of the rock shafts D, D' whereby the ground-working units and markers are normally held in raised position and whereby said units and markers are adapted to be released for lowering movements into their working positions.

The manner in which the connection is made between shafts D and D', and the planting units is not my invention, such connection being employed regardless of whether or not a marker is used with the planter. Suitable connections are shown in Patent No. 2,234,923.

As is customary, the right and left hand markers E, E' are disposed at opposite sides of the rear end of the frame A and are pivotally connected at their lower ends to the footboard E² or some fixed portions of the frame to swing laterally of the machine outwardly and downwardly to lowered ground engaging working positions and upwardly and inwardly to raised inoperative transport positions. Each marker has a stay connection E³ and a cushioning spring connection E⁴ with some suitable fixed portions applied to the frame, the spring acting to cushion the lowering movement of the marker and to assist in raising it. To the rear ends of marker lifter shafts F, F', mounted for rocking movements on the frame and extending transversely of the rock shafts D, D', are attached marker lifter arms G, G'. Cables H, H' passing over guide sheaves or pulleys h, h' on the frame and uprights H² fixed to the frame are attached at one end to the markers and at their opposite ends to the marker lifter arms G, G'. As shown, the cable H connects the right hand marker E with the left hand lifter arm G', while the cable H' connects the left hand marker E' with the right hand lifter arm G. This arrangement permits each marker to be raised by the power lift device which raises the seeding unit on the opposite side, and means to be more fully described hereinafter are provided also actuated by the power lift devices for releasing the proper marker from the raised position so that it may function during the seeding operation.

Figure 2:
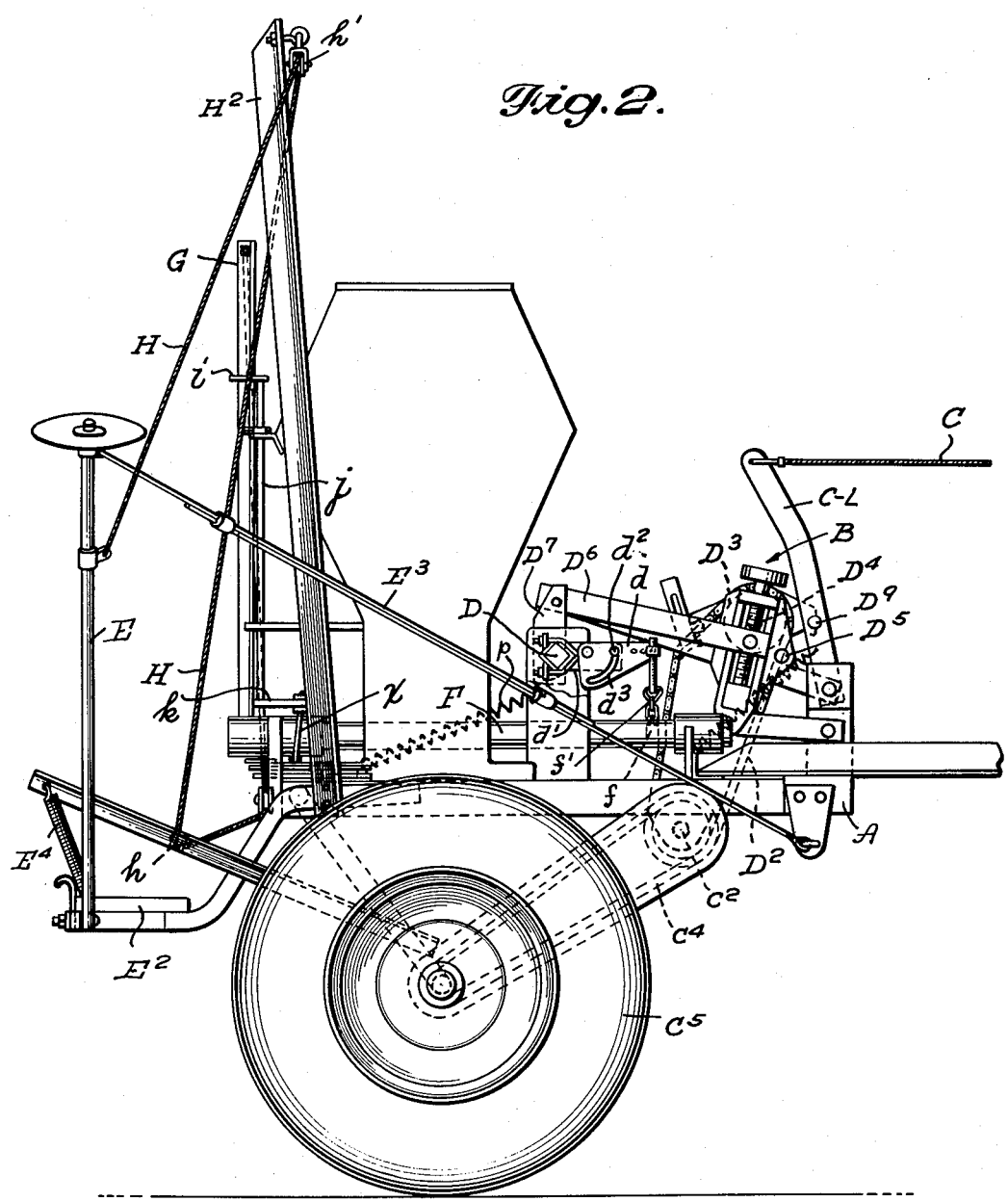
Fig. 2 is a view in side elevation of the parts shown in Fig. 1 on an enlarged scale, showing the right hand marker raised and also showing parts of the marker releasing and raising means at the adjacent side of the machine.

Each marker lifter shaft F, F' is provided at its forward end (Figs. 2, 3 and 5) with a crank arm f which is coupled by a connection f' with a crank arm d pivoted to a bracket plate d' fixed to the adjacent rock shaft D or D' and having a lost motion pin-and-slot coupling connection d², d³ (Fig. 2) with said bracket plate d' adapting said plate to turn downwardly and forwardly with the shaft D or D'. When the shaft D or D' is so turned to lower the associated seeding unit A' the crank arm d will move therewith to permit the coacting shaft F or F' to rotate in the proper direction to allow marker releasing motion of the associated lifter arm G or G', while permitting movement of said parts d and F or F' and G or G' back to normal marker raising position prior to the raising of the associated unit A' so as to allow the raised arm G or G' to be latched to hold the marker actuated thereby in lifted position just prior to the lifting of the unit A'.

Each arm G, G' is adapted to be held in raised position by a U-shaped latch i rigidly secured at the upper end of a vertical shaft j, a pair of said shafts being provided at opposite ends of the machine, each being journaled on the machine frame and provided at its lower end with a crank arm or latch actuating and controlling lever k. Each of the latches i is adapted to be independently turned or swung to open position by rotation of its shaft j in one direction to release its respective marker lifter arm G, G', permitting the released arm to pivot downwardly, after which the shaft j and the latch i are returned to their original position by the action of a tension spring y² (the right hand one only of which is shown in Fig. 4), and on upward movement of either arm G or G' such arm will be reengaged by its latch i after the manner of a door latch, as will be more fully described hereinafter.

In accordance with my invention a controller L in the form of an automatic motion transmitting latch or controller mechanism is provided for governing the action of the marker arm latches i. The controller L comprises a base plate M fixed to a cross beam M' of the machine frame and spaced therefrom for the reception and movement of a flat T-shaped actuating lever or plate N having a main arm or staff portion n, a pair of oppositely extending actuating arms o, o' arranged at one (the forward) end of said main arm or staff portion n and a headed pin or stud o² arranged at the opposite or rear end of said main portion, said lever N being pivoted on plate M at a central point between the arms o, o', as shown at o³, to swing laterally in opposite directions from its normal or neutral position shown in Fig. 4 to the positions shown in Figs. 6, 7 and 8 and 9, 10 and 11, respectively. The arms o, o' of the T-shaped lever N are coupled by motion transmitting and retracting springs p, p' to crank arms q, q' on the rock shafts D, D', which hold the springs normally under tension to maintain the parts of the controller in normal or neutral position, and whereby the actuating lever N is adapted to be moved in one direction or the other by said springs when the respective shafts D, D' are operated by the power lift devices B, B' to lower or raise the planting units and raise or permit lowering of the markers E, E'. On the base plate M is also mounted a separate generally triangular plate-like motion transmitting lever R which is pivoted at its vertex, as shown at r, to the base plate and provided at its base portion with an arcuate or cam slot r' to receive the pin or stud o² which is movable therein and in a longer arcuate or cam slot m in the base plate M. When the actuating lever N is moved in one direction or the other the stud o² engages the lever R and swings the latter in the same direction, the stud being movable in the slots r', m to permit independent and conjoint movements of the levers to the extent of the lengths of the slots.

Pivotally mounted at s² on the base plate are angular levers S, S' having releasing arms s, s', respectively, and pivoted push arms t, t', which latter have notched free ends t² to engage the stud o² with which they are adapted to be held in engagement by springs u'. Levers S, S' carry at their upper ends contact pins or rollers u² which engage and slide on the inclined side edges or cam surfaces u³ of the lever R through the movements of which and the action of the springs u' the movements of the said levers S, S' are controlled. In the neutral position of the controller shown in Fig. 4 the forward sides of the push arms t, t' ride in engagement with the stud o². When the levers N and R are swung to left or right a sufficient distance the ends t², t² of the push arms t, t' are adapted to contact the stud o² which is rigidly carried by the lever N through levers S, S', whereby motion is transmitted from the lever N to the lever R and thence through suitable connections now to be described to one or the other of the marker arm latches i to release its respective marker arm G or G', depending on the direction in which the levers N and R are swung from the neutral position.

As shown, pivotally mounted on the beam M' are motion transmitting and reversing levers V, V', one for cooperation with each marker latch shaft j and lever k, each of said levers V, V' having oppositely extending arms v, v'. The arms v of these levers are coupled by connecting rods w, w' to the motion transmitting lever R, while the arms v' of said levers are coupled to the inner ends of trip rods x, x' which are connected at their outer ends to the crank arms or levers k of the latch shafts j at opposite sides of the machine. Each of these rods x, x as illustrated by the right hand rod x shown in Fig. 4, has a slotted end portion y slidably engaging a pin y' on the crank arm k, providing an actuating and lost-motion connection between the two which allows retraction of the rod x and lever V for return to normal position, after each actuating movement thereof, without interference from and without transmitting motion to the crank arm k. The tension spring y² previously referred to has one end connected to a clamp or the like secured to rod x and the other end connected to the pin y', said spring serving to return its latch i to the closed position indicated in Fig. 4 as soon as such latch is released by the controller, and permits arm G or G' to be automatically engaged with its latch i by cam action as such arm swings to its upright position.

In the operation of the controller L, which normally occupies the neutral position shown in Fig. 4, to release the right hand latch i from the lifting arm G, the clockwise movement of rock shaft D (as viewed in Fig. 2), to lower the right hand planting unit, causes relaxation of the tension in spring p, whereupon the tension in spring $p'$, being no longer opposed by the tension in spring $p$, operates on arm $o'$ of the actuating lever N to cause said lever to swing on its pivot $o^3$, thus moving the staff portion $n$ of actuating lever N to the left to the position shown in Fig. 6 and arms $o$, $o'$ rearwardly and forwardly, respectively. In this movement of lever N the stud $o^2$ rigid therewith is first moved idly from its normal or neutral position shown in Fig. 4 into engagement with the left hand end of slot $r'$ in the motion transmitting lever R (Fig. 6) and then said stud transmits motion to lever R until the stud $o^2$ engages the left hand end of slot $m$ in the base plate M (Fig. 7), whereby rod $w$ is drawn upon to operate associated lever V causing outward movement of rod $x$ and actuation of associated crank arm $k$ to shift latch $i$ to partial release position and right hand spring $u'$ acts to move push arm $t$ forwardly and stud $o^2$ is engaged by notched end $t^2$ of the push arm $t$.

The tension in spring $p'$ is now relaxed sufficiently so that the tension in spring $p$ becomes effective to return the parts to neutral position, and as lever N moves toward neutral position, stud $o^2$ engaged by the notched end $t^2$ of push arm $t$ as in Fig. 7, transmits power to push arm $t$ and as the lever N continues to travel toward neutral position power is transmitted to lever R through push arm $t$ and lever S, and R continues to move to the left (Fig. 8) and pulls on rod $w$ which now effects the full release of latch $i$, allowing arm G to fall and lower the left hand marker E'.

As lever N nears the neutral position arm $s$ on lever S comes in contact with push arm $t$, and as lever N continues toward neutral position arm $s$ pushes on push arm $t$ and disengages notch $t^2$ from stud $o^2$, as indicated in Fig. 8, whereupon the parts are fully returned to neutral position as in Fig. 4 and are retained therein by the tension in the springs $p$, $p'$ until the tension of either is released by operation of one of the rock shafts D or D'.

The above description applies particularly to the operation of the right hand power-lift B to drop the planting unit at the right hand side of the machine and lower the left hand marker but the operation of the parts in dropping the left hand planting unit and right hand marker will be readily understood from the foregoing description taken in connection with Figs. 9, 10 and 11, which shows the movements of the controller in such dropping actions, the motions of the controller parts being the reverse of those shown in Figs. 6, 7 and 8.

In the above described movements of the push arms $t$, $t'$, when levers N and R are swung either to the right or left, levers S, S' swing on their pivots and cooperate with the springs $u$, $u'$ to accommodate the movements of the push arms and hold them in yielding engagement with the stud $o^2$ and to move the releasing arms $s$, $s'$ from normal to releasing position and back again. As before stated, push arm $t$ is released by arm $s$ for the return of controller parts to neutral position after a left hand movement of parts N, R to drop the left hand marker, and it will be understood that push arm $t'$ will be released by arm $s'$ for the return of the controller to normal position after a right hand movement of parts N, R to drop the right hand marker.

It will be understood that the several lost-motion connections between the marker lifter rock shafts D, D' and the rock shafts F, F', between the latch operating cranks $k$ and trip rods $x$ and between the parts of the controller, are designed and adapted to allow both the planting units and the markers to be controlled and operated to secure proper lowering and raising movements of the planting units and the raising and lowering of the correct marker at the proper time, through the action of the two power-lifts and the two pull ropes C, C' by which they are controlled, so as to dispense with the use of independent pull ropes for operating the markers and the necessity of holding them to keep the markers raised when the machine is making turns, whereby the hands of the operator will be left free to operate the machine while the turns are being made. This requires on each operation of the parts at the end of each row the raising of a planting or sowing unit on one side and the raising of the marker on the opposite side and on the completion of the turning movement and the start of a new row lowering of the same planting unit and lowering the other marker, for which my invention provides, and which actions are automatically performed through the actuation of the power-lift devices by their pull ropes. When, for example, the right hand power-lift rope C is pulled to raise the right hand planting unit and raise the left hand marker E' the shifting movements of the parts of the controller cause the trip rod $x$ at the right hand side to be moved outwardly to release the latch at that side, while at the same time the trip rod $x'$ at the left hand side will be moved inwardly, thus positioning the stud $y'$ of the left hand crank arm $k$ at the outer end of the slot $y$ in the left hand trip rod $x'$. This allows movement of the controller parts back to neutral position and the lowering of the planting unit at the left hand side of the machine on operation of the pull rope C' without releasing the left hand latch $i$ which holds the marker lifter arm G' of the right hand marker E elevated, so that while the left hand planting unit will be dropped the marker E will remain in raised position and the controller parts will be reset and returned to neutral position for normal operation. Similarly, if the controller parts are first shifted to the right by actuation of rope C' to drop the planting unit at the left hand side and lower the marker E, the trip rods $x$, $x'$ at the right and left hand sides will be shifted reversely to that previously described so as to dispose the stud $y'$ of the right hand latch crank arm $k$ at the outer end of slot $y$ of the right hand trip rod $x$, whereby on a pull of rope C the right hand planting unit will be dropped and the controller parts will be moved back to normal or neutral position without releasing the arm G so that the left hand marker E' will remain in raised position.

Summary of operation

In operating the machine, it will be assumed, for example, that the operator is starting to sow in a field running north and south and beginning at the south end and east side going north and south and working westward, the operator starts the machine with both markers and both planter units raised.

With the planting units raised both springs $p$ and $p'$ of the controller are equally tensioned. A pull on rope C lowers the right hand planting unit and relaxes the tension in spring $p$, thereby permitting the tension in spring $p'$ to act to move plate member or actuating lever N of controlled L clockwise from the neutral position shown in Fig. 4 to a position shown in Fig. 7 with stud $o^2$ engaged in the notch $t^2$ of push arm $t$. Both markers however, remain raised until rope C' is pulled to lower the left hand planting unit, thereby relaxing the tension in spring $p'$ which pulls the plate N to a neutral position. While the plate N is being pulled to neutral position it moves the push arm $t$ and lever S, whereby plate R is moved further clockwise to the position shown in Fig. 8 to trip the latch $i$ on the right hand side, thereby dropping left hand marker E'. The members N and R are now in neutral position and the operator is prepared to sow to the other end of the field. Having reached the north end of the field rope C is actuated, thus raising the right hand planting unit and left hand marker E'. When the planting right hand unit is raised it further tensions spring $p$, pulling plate N counterclockwise into the position shown in Fig. 11. On turning to head in the opposite direction (south) the operator pulls rope C again, which lowers the right hand planting unit and relaxes the tension in spring $p$, allowing the tension in spring $p'$ to pull plate N clockwise toward neutral position. Before plate N starts to neutral position stud $o^2$ is engaged by the notched end $t^2$ of push arm $t'$, then as the plate N is pulled to neutral position the plate R is moved further in a counterclockwise direction through push arm $t'$ and member $S'$, thereby tripping latch $i$ on the left side and lowering the right hand marker E. The members R and N are now again in neutral position and the operator is prepared to proceed to the south end of the field. When rope $C'$ is pulled at the south end of the field the left hand planting unit and right hand marker E are raised, and at the same time spring $p'$ is tensioned and the plate N pulled in a clockwise direction. After turning to head north the operator pulls the rope $C'$ again, thus lowering the left hand planting unit and relaxing the tension in spring $p'$, thereby permitting the tension in spring $p$ to pull the plate counterclockwise to neutral position. Before plate N starts to the neutral position stud $o^2$ is engaged by the notched end $t'$ of push arm $t$. Then as plate N is pulled to neutral position the plate R is moved further clockwise through push arm $t$ and lever S to the position shown in Fig. 8 to trip latch $i$ on the right hand side and drop the left hand marker $E'$. The members R and N are now once more in neutral position and the operator is prepared to sow the north end of the field, and each successive turn is completed in accordance with the preceding explanations.

Ropes C and $C'$ have no direct connection in accordance with my invention except that they trip the power lift devices B, $B'$ respectively into action and the resulting action operates the markers.

As stated, the power lift device B may be of any suitable or conventional construction, and they may be, as shown, of the general type shown in the aforementioned Patent No. 2,234,923 in which two power lift devices are employed. These power lift devices include right and left hand jack shafts $C^2$, $C^3$, each driven by a chain drive connection $C^4$ from the adjacent supporting wheel $C^5$ and each connected by a sprocket chain $D^2$ with a sprocket gear $D^3$ loose on a crank shaft $D^4$. The crank shaft $D^4$ is journaled at one end on the machine frame and at its opposite end in a crank member or rockable trunnion arm $D^5$ pivoted at its lower end to the machine frame. Adjustably connected at one end to this member $D^5$ is a link $D^6$ which is connected at its opposite end to a crank arm $D^7$ on the rock shaft D or $D'$, whereby through rocking movements of the member $D^5$ motion may be transmitted through the link $D^6$ to rock the shaft D or $D'$ and thereby lower or raise the planting units connected therewith. Fixed to the crank shaft $D^4$ is one part $D^8$ of a half-revolution clutch, the other part of which is carried by the sprocket $D^3$, the clutch part $D^8$ having a flange portion provided with seat recesses for interlocking engagement with a spring retracted control lever mounted on the frame. Two such control levers C—L and C—$L'$ are provided, one connected with the rope C for operating the right hand power lift device and the other connected with the rope $C'$ for operating the left hand power lift device. Each of these levers is provided with a locking pin $D^9$ to engage the recess in the clutch part $D^8$ of its associated power lift device. The locking pin of each lever is adapted to engage the clutch part $D^8$ and hold the same from engagement with the gear $D^3$ in either the raised or lowered position of the planting unit operated by the associated power lift device. When a planting unit operated by either power lift device is in the raised position, a first forward pull on the rope C or $C'$ and its subsequent release will move lever C—L or C—$L'$ to released position, whereby the associated power lift device will be actuated to lower the planting unit and lock the device from raising movement, while another forward pull on and subsequent release of the rope C or $C'$ will throw the power lift device into operation to raise the planting unit and lock the power lift device in raised position.

From the foregoing description, taken in connection with the drawings, the construction and operation and mode of controlling the operation of the machine in sowing in any direction will be readily understood and the advantages of the invention appreciated by those versed in the art without a further and extended description. It is to be understood, of course, that while I have shown certain structural means for carrying my invention into practical effect, I do not limit the invention thereto, as changes in the form, construction, arrangement and mode of operation of the parts may be made within the scope of the appended claims without departing from the spirit or sacrificing any of the advantages of the invention.

Having thus described my invention, I claim:

1. In a grain drill or the like having separate right and left hand seeding units, individual self-lowering right and left hand markers, and separate power lift devices one associated with each of said seeding units for raising and lowering said separate seeding units, each of said power lift devices having connections with one of the separate markers for raising one of said markers simultaneously with the raising of one of said units, separate marker latches one associated with each of said markers for retaining the same in raised position until said latch is released, and latch control means operatively connected to each of said power lift devices and also having connections with each of said marker latches for individually releasing one of said latches when its associated power lift device is actuated for lowering its associated seeding unit, whereby both the said seeding unit and said marker may be lowered simultaneously.

2. A grain drill as set forth in claim 1, wherein each marker is raised simultaneously with the raising of the seeding unit on the opposite side of the grain drill.

3. A grain drill as set forth in claim 1, wherein the latch control means includes a movable member shiftable in opposite directions from a neutral position by actuation of the power lift devices, said movable member of the latch control means having lost motion connections with the individual marker latches to permit independent release of the individual latches on opposite movements of the latch control means from its neutral position.

4. A grain drill as set forth in claim 3, wherein the control means is normally held in neutral position by a pair of tension springs, one associated with each of the power lift devices and each adapted to have its tension relaxed on actuation of the proper power lift device.

5. A grain drill or the like as set forth in claim 1, wherein each power lift device has associated therewith and operated thereby a rock shaft, individual pull ropes for independently actuating each of said power lift devices, each marker being connected to an individual marker lift arm adapted to be moved from lowered to raised position by operation of one of said rock shafts, and each marker lift arm being carried by a lift arm rock shaft having a lost motion connection with one of the rock shafts, one of said marker latches being adapted to engage one of the marker lift arms when in raised position and to release the same when actuated by movement of the latch control means in one direction from a neutral position, and the other marker latch being similarly adapted to engage the other marker lift arm when in raised position and to release the same on actuation of the controller in the opposite direction.

6. In a grain drill or other like agricultural machine having ground working units, one at each side thereof independently adjustable into and out of working position, a pair of power lift devices at opposite sides of the machine, each of the power lift devices being operatively connected with the ground working unit on its side for adjusting the same, a pair of markers one on each side of the machine, and a pair of latch mechanisms, one associated with each of the markers for holding its marker in raised position, connections between the power lift device at each side of the machine and the marker at the opposite side of the machine for raising said marker when the power lift device is operated to raise the ground working unit at its side of the machine, and means actuated by operation of the power lift devices for controlling and releasing the latch mechanisms.

7. The combination with a grain drill or like agricultural machine having ground working units at opposite sides thereof adapted to be independently lowered and raised into and out of operative position, and power-lift-operated elements one at each of the opposite sides of the machine and each associated with and connected to the ground working unit on its side of the machine for lowering and raising its ground working unit; of a pair of self-lowering markers at opposite sides of the machine, connections between each power-lift-operated element at one side of the machine and the marker at the opposite side of the machine for lifting said marker and restraining it from lowering movement when such power-lift-operated element is actuated to raise the associated ground working unit and to free the said marker from restraint to permit of its lowering movement when the proper power-lift element is operated to lower the associated ground working unit, and latch means controlled by such movements of the power-lift-operated elements for holding the markers in raised position and releasing them for movement to lowered position, said latch means comprising a latch for each marker, a controller shiftable in opposite directions from a neutral position by the movements of the power-lift-operated elements, and connections between the controller and the respective latches having lost-motion connections with the latches to permit independent release of the latches on opposite movements of the controller from its neutral position.

8. The combination with a grain drill or like agricultural machine having ground working units at opposite sides thereof adapted to be independently lowered and raised into and out of operative position, and power-lift-operated rock shafts one at each of the opposite sides of the machine and each associated with and connected to the ground working unit on its side of the machine for lowering and raising its ground working unit; of a pair of self-lowering markers one located at each side of the machine, marker lifting means including a marker lifting rock shaft at each side of the machine connected to and operative for raising the marker at the opposite side of the machine, a lost-motion connection between the power-lift-operated rock shaft and the marker lifting rock shaft at the same side of the machine for moving the marker lifting rock shaft in lifting direction and holding it in marker lifted position when the power-lift-operated rock shaft is moved to raise its unit and freeing the marker lifting rock shaft for marker lowering movement when said power-lift-operated rock shaft is moved to lower its unit, latches holding the markers in raised position until positively disconnected from the markers, and a controller governed in action by the movements of the power-lift-operated rock shafts for disconnecting the latches.

9. The combination with a grain drill or like agricultural machine having ground working units at opposite sides thereof adapted to be independently lowered and raised into and out of operative position, and power-lift-operated rock shafts one at each of the opposite sides of the machine and each associated with and connected to the ground working unit on its side of the machine for lowering and raising its ground working unit; of a pair of self-lowering markers one located at each side of the machine, marker lifting means including a marker lifting rock shaft at each side of the machine connected to and operative for raising the marker at the opposite side of the machine, a lost-motion connection between the power-lift-operated rock shaft and marker lifting rock shaft at each side of the machine for moving the marker lifting rock shaft in lifting direction and holding it in marker lifted position when the power-lift-operated rock shaft is moved to raise its unit and freeing the marker lifting rock shaft for marker lowering movement when said power-lift-operated rock shaft is moved to lower its ground workering unit, latches holding the markers in raised position until positively disconnected from the marker, a controller governed in action by the movements of the power-lift-operated rock shafts and movable in opposite directions from a neutral position to disconnect the respective latches, and connections between the controller and the latches having lost-motion means for action on each latch in one direction of movement only of the controller.

10. The combination with a grain drill or like agricultural machine having ground working units at opposite sides thereof adapted to be independently lowered and raised into and out of operative position, and power-lift devices one at each of the opposite sides of the machine and each associated with and connected to the ground working unit on its side of the machine for lowering and raising its ground working unit; of a pair of self-lowering markers one at each side of the machine, means connecting the power-lift device at each side of the machine with the marker at the opposite side of the machine for raising said marker when said power-lift device is moved to raise its ground working unit, a pair of latches one at each side of the machine and associated with the adjacent marker for holding said marker in raised position, and means for operating the latches comprising a controller movable in opposite directions to operate the respective latches, sets of connections between the controller and latches for operating the latches, each set comprising a lever having oppositely extending arms, a rod connecting one of said arms with the controller, a rod connecting the other arm with the latch and having a pivotal lost-motion connection with the latch, and connections between the controller and the power-lift devices for normally maintaining the controller in neutral position and oppositely moving the controller when the power-lift devices are actuated.

References Cited in the file of this patent

UNITED STATES PATENTS

| | | |
|---|---|---|
| 1,514,700 | Harris | Nov. 11, 1924 |
| 1,751,951 | Schaeffer | Mar. 25, 1930 |
| 2,341,146 | Kriegbaum et al. | Feb. 8, 1944 |
| 2,376,464 | White | May 22, 1945 |
| 2,537,543 | Oehler | Jan. 9, 1951 |
| 2,586,356 | Lewis | Feb. 19, 1952 |